Patented July 30, 1929.                                                    1,722,647

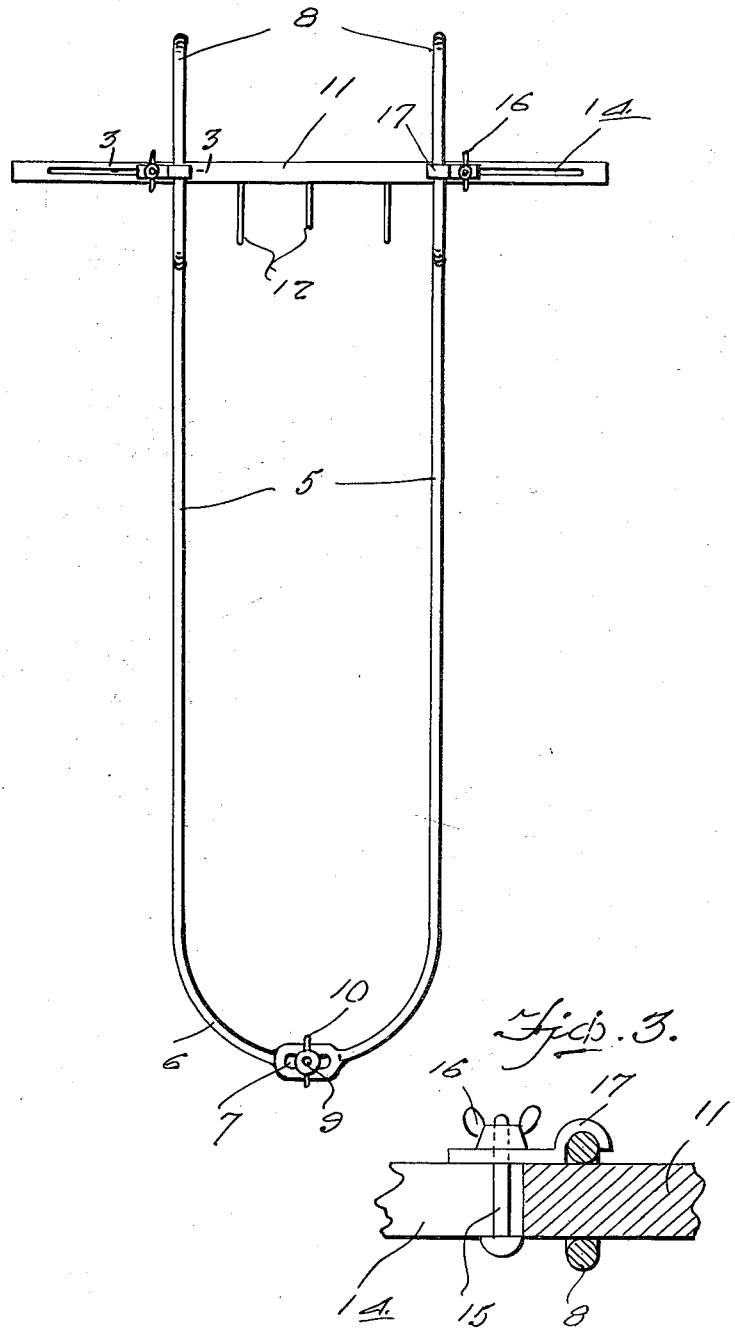
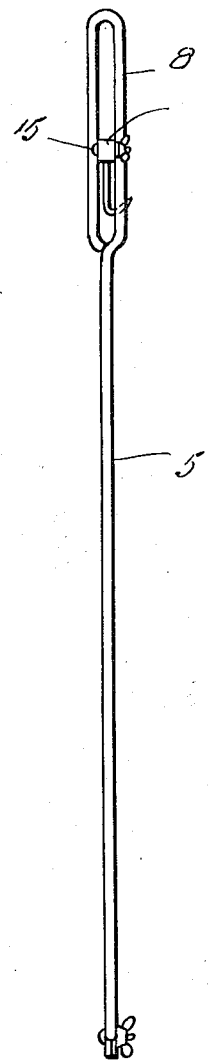
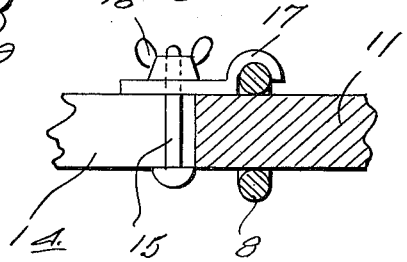

UNITED STATES PATENT OFFICE.

RUFUS VICKREY, OF WALNUT, ILLINOIS.

STRETCHING APPARATUS.

Application filed April 19, 1928. Serial No. 271,193.

The present invention appertains to devices for use in holding, stretching and drying pelts, skins and the furs of fur bearing animals, particularly small fur bearing animals as a preliminary step in subsequent use and manufacture of a garment.

An important object of the invention is to afford a stretcher which can be quickly inserted in the hide of an animal and the hide secured thereto and the frame of the stretcher spread so as to stretch the hide to the desired extent.

Another object of the invention is to afford a stretcher that may be readily adjusted to meet the requirements as to various sizes of hides.

A still further very important object of the invention resides in the provision of a stretcher of this nature which is exceedingly simple in its construction, easy to manipulate, strong and durable, inexpensive to manufacture, compact and convenient in its arrangement of parts, and thoroughly efficient and reliable for the purpose intended.

The preferred means for carrying out my invention in the practical manner is shown in the accompanying drawings, in which:

Figure 1 is a plan view of my entire device.

Figure 2 is an edge elevation thereof, and

Figure 3 is an enlarged detail section, taken substantially on the line 3—3 of Figure 1.

Referring to the drawing in detail, it will be seen that the numeral 5 denotes two bars, adjacent ends of which are curved toward each other as indicated at 6, and has slotted terminals 7. The other ends are provided with elongated loops 8. A bolt 9 extends through the slots 7 and has a wing nut 10 thereon to provide for necessary and desirable adjustments. A bar 11 of straight construction extends through the looped ends 8 and has a plurality of belt engaging hooks 12 extending therefrom. The ends of the bar 11 are provided with elongated longitudinally extending slots 14, through which extend bolts 15 with wing nuts 16 engaged thereon. Clips 17 are provided on the bolts 15 and engage the loop ends so as to hold the bars 5 in different adjusted positions with respect to each other and at different angles to each other as will be quite apparent.

From the above detailed description it will be seen that the stretcher is capable of several very desirable adjustments which may be accomplished with facility. It will be further seen that no tubes are necessary in the manipulations incident to the various adjustments. The hide may be easily pulled over the curved ends 6 and then engaged with the hooks 12, on the cross bar 11. The side bars may then be moved outwardly by swinging them on the bolt 9 and then the thumb nuts 16 may be tightened.

It is thought that the construction, utility and advantages of the invention will now be quite apparent to those skilled in this art, without a more detailed description thereof. The present embodiment of the invention has been disclosed in considerable detail, merely by way of example, since in actual practice it attains the features of advantage enumerated as desirable in the statement of the invention and the above description.

It will be apparent that various changes in the details of construction and in the combination and arrangement of parts may be resorted to, without departing from the spirit or scope of the invention hereinafter claimed or sacrificing any of its advantages.

Having thus described my invention, what I claim as new is:

1. A stretching apparatus of the class described comprising a pair of side bars having the ends curving inwardly toward each other, the terminals of the curved ends being slotted, a bolt extending through the slots, the other end of the side bars being formed with elongated loops, a cross bar extending through the loops, and means for adjustably engaging the loops with the cross bar.

2. A stretching apparatus of the class described comprising a pair of side bars, means pivotally engaging the side bars together, the free ends of the side bars being provided with elongated loops, a cross bar extending through the loop, the ends of the cross bar being slotted, bolts slidable in the slots, means for tightening the bolts in different adjusting positions, and clips on the bolts for engaging the looped ends, and hooks engaged on the intermediate portions of the cross bar.

3. A stretching apparatus of the class described comprising a pair of side bars, means pivotally securing together the adjacent ends of the side bars, the other ends of the side bars being formed with loops, a cross bar connected to the loops, and means adjustably engaging the looped ends of the side bars with the cross bar.

In testimony whereof I affix my signature.

RUFUS VICKREY.